United States Patent
Weiner (10) Patent No.: US 10,641,327 B2
(45) Date of Patent: May 5, 2020

(54) OIL SUPPLY SYSTEM FOR FLUID FILM DAMPER

(71) Applicant: UNITED TECHNOLOGIES CORPORATION, Farmington, CT (US)

(72) Inventor: Richard Alan Weiner, Farmington, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/035,391

(22) Filed: Jul. 13, 2018

(65) Prior Publication Data

US 2020/0018350 A1  Jan. 16, 2020

(51) Int. Cl.
*F16C 27/04* (2006.01)
*F16C 32/06* (2006.01)
*F02C 7/06* (2006.01)

(52) U.S. Cl.
CPC .............. *F16C 27/045* (2013.01); *F02C 7/06* (2013.01); *F16C 32/0677* (2013.01); *F05D 2220/32* (2013.01); *F05D 2240/50* (2013.01)

(58) Field of Classification Search
CPC .. F16C 27/045; F16C 32/0677; F01D 25/164; F16F 15/0237
USPC .......................................................... 384/99
See application file for complete search history.

(56) References Cited

U.S. PATENT DOCUMENTS

| | | | |
|---|---|---|---|
| 4,775,248 A | 10/1988 | Barbic et al. | |
| 4,782,919 A * | 11/1988 | Chalaire | F16F 15/0237 184/6.11 |
| 5,207,511 A | 5/1993 | Bobo | |
| 5,251,985 A * | 10/1993 | Monzel | F16F 1/32 384/99 |
| 5,320,134 A | 6/1994 | Singh | |
| 5,344,239 A | 9/1994 | Stallone et al. | |
| 6,135,639 A | 10/2000 | Dede | |
| 8,858,173 B2 | 10/2014 | Marsal et al. | |
| 9,494,048 B1 | 11/2016 | Parnin | |
| 2013/0294917 A1 | 11/2013 | Alam | |
| 2017/0234158 A1 | 8/2017 | Savela | |
| 2018/0128124 A1 | 5/2018 | Avis et al. | |

FOREIGN PATENT DOCUMENTS

| JP | 519631 | * 3/1993 |
|---|---|---|
| WO | 2014130121 | 8/2014 |

OTHER PUBLICATIONS

European Patent Office, European Search Report dated Oct. 25, 2019 in Application No. 19186096.4.

* cited by examiner

*Primary Examiner* — James Pilkington
(74) *Attorney, Agent, or Firm* — Snell & Wilmer, L.L.P.

(57) ABSTRACT

A fluid film damper may comprise a sleeve, an annular support housing surrounding the sleeve, an annular volume between the annular support housing and the sleeve, a first supply conduit in fluid communication with a first inlet to the annular volume, a second supply conduit in fluid communication with a second inlet to the annular volume, wherein the first inlet is disposed opposite the annular volume from the second inlet, and a common oil supply conduit in fluid communication with the annular volume via a check valve, wherein the common oil supply conduit supplies the fluid to the annular volume via the first supply conduit and the second supply conduit.

19 Claims, 5 Drawing Sheets

OIL SUPPLY SYSTEM FOR FLUID FILM DAMPER

FIELD

The present disclosure relates to gas turbine engines, and, more specifically, to fluid film dampers for damping cyclical, transverse orbital movement of a gas turbine engine rotor.

BACKGROUND

Oil is typically supplied to a bearing damper to reduce the oscillation amplitude of an unbalanced engine rotor (e.g. bowed rotor during engine start). As the unbalanced engine rotor rotates, an oil pressure oscillation may be induced in the bearing damper oil supply line. A check valve in the bearing damper oil supply line may be provided to prevent the large amplitude oil pressure oscillation from working its way upstream of the check valve. However, depending upon the design and dynamic response of the check valve, a large amplitude oil pressure oscillation may still work its way upstream of the check valve.

SUMMARY

A fluid film damper is disclosed, comprising a sleeve, an annular support housing surrounding the sleeve, an annular volume between the annular support housing and the sleeve, a first supply conduit in fluid communication with a first inlet to the annular volume, a second supply conduit in fluid communication with a second inlet to the annular volume, wherein the first inlet is disposed opposite the annular volume from the second inlet, and a common oil supply conduit in fluid communication with the annular volume via a check valve, wherein the common oil supply conduit supplies the fluid to the annular volume via the first supply conduit and the second supply conduit.

In various embodiments, the first inlet is disposed 180° around the annular volume from the second inlet.

In various embodiments, the sleeve is mounted about a shaft being supported by bearings.

In various embodiments, the shaft rotates about a central shaft axis with respect to the sleeve.

In various embodiments, the fluid film damper dampens the transverse orbital movement of a vibration excited from the shaft whereby a high pressure and low pressure wave pattern precesses orbitally within said annular volume to drive the fluid between the first inlet and the second inlet via the first supply conduit and the second supply conduit.

In various embodiments, the check valve prevents back flow for the fluid from the first supply conduit and from the second supply conduit.

In various embodiments, the check valve is coupled halfway between the first inlet and the second inlet.

A fluid film damper is disclosed, comprising a sleeve, an annular support housing surrounding the sleeve, an annular volume between the annular support housing and the sleeve, a first supply conduit in fluid communication with a first inlet to the annular volume, a second supply conduit in fluid communication with a second inlet to the annular volume, wherein the first inlet is disposed opposite the annular volume from the second inlet, and the first supply conduit and the second supply conduit form a full loop flow path between the first inlet and the second inlet, a common oil supply conduit in fluid communication with the annular volume via the first supply conduit and the second supply conduit, and a check valve, wherein the common oil supply conduit supplies the fluid to the first supply conduit and the second supply conduit via the check valve.

In various embodiments, the first inlet is disposed 180° around the annular volume from the second inlet.

In various embodiments, the sleeve is mounted about a shaft being supported by bearings.

In various embodiments, the shaft rotates about a central shaft axis with respect to the sleeve.

In various embodiments, fluid film damper controls the transverse orbital movement of a vibration excited from the shaft whereby a high pressure and low pressure wave pattern precesses orbitally within said annular volume to drive the fluid between the first inlet and the second inlet via the first supply conduit and the second supply conduit.

In various embodiments, the check valve prevents back flow for the fluid from the first supply conduit and from the second supply conduit.

In various embodiments, the check valve is coupled halfway between the first inlet and the second inlet.

In various embodiments, a first length of a first flow path between the check valve and the first inlet is equal to a second length of a second flow path between the check valve and the second inlet.

A method for installing a fluid film damper is disclosed, comprising coupling a first supply conduit to a first inlet to an annular volume, coupling a second supply conduit to a second inlet to the annular volume, wherein the first inlet is disposed opposite the annular volume from the second inlet, coupling a check valve to the first supply conduit and the second supply conduit, and coupling a common oil supply conduit to the check valve, wherein the common oil supply conduit is in fluid communication with the annular volume via the check valve, wherein the common oil supply conduit supplies the fluid to the annular volume via the first supply conduit and the second supply conduit.

In various embodiments, the first supply conduit is coupled to the second supply conduit to form a full loop flow path between the first inlet and the second inlet.

In various embodiments, the method further comprises disposing an annular support housing to surround a sleeve.

In various embodiments, the annular volume is at least partially defined by the annular support housing and the sleeve.

In various embodiments, the first inlet is disposed 180° around the annular volume from the second inlet.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials. In some cases, reference coordinates may be specific to each figure.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

A fluid film damper system as disclosed herein may comprise a common oil supply conduit split into two equal length supply conduits in fluid communication with an annular volume. The supply conduits may provide an open flow path between two opposite sides of the annular volume. The fluid film damper system may reduce hydraulic pressure experienced by a check valve in the common oil supply conduit. Stated differently, the fluid film damper system may attenuate the amplitude of the oil pressure oscillation at the check valve and upstream of the check valve. In this regard, a fluid film damper system as disclosed herein may improve the service life of the check valve, the supply conduits, and other oil system components located upstream of the check valve. Furthermore, an imbalance in oil pressure between a first inlet of the fluid film damper and a second inlet of the fluid film damper may result in some oil flow from the high pressure inlet to the low pressure inlet. This oil flow may reduce cavitation in the low pressure side, improving bearing and/or damper component life.

Figure 1:
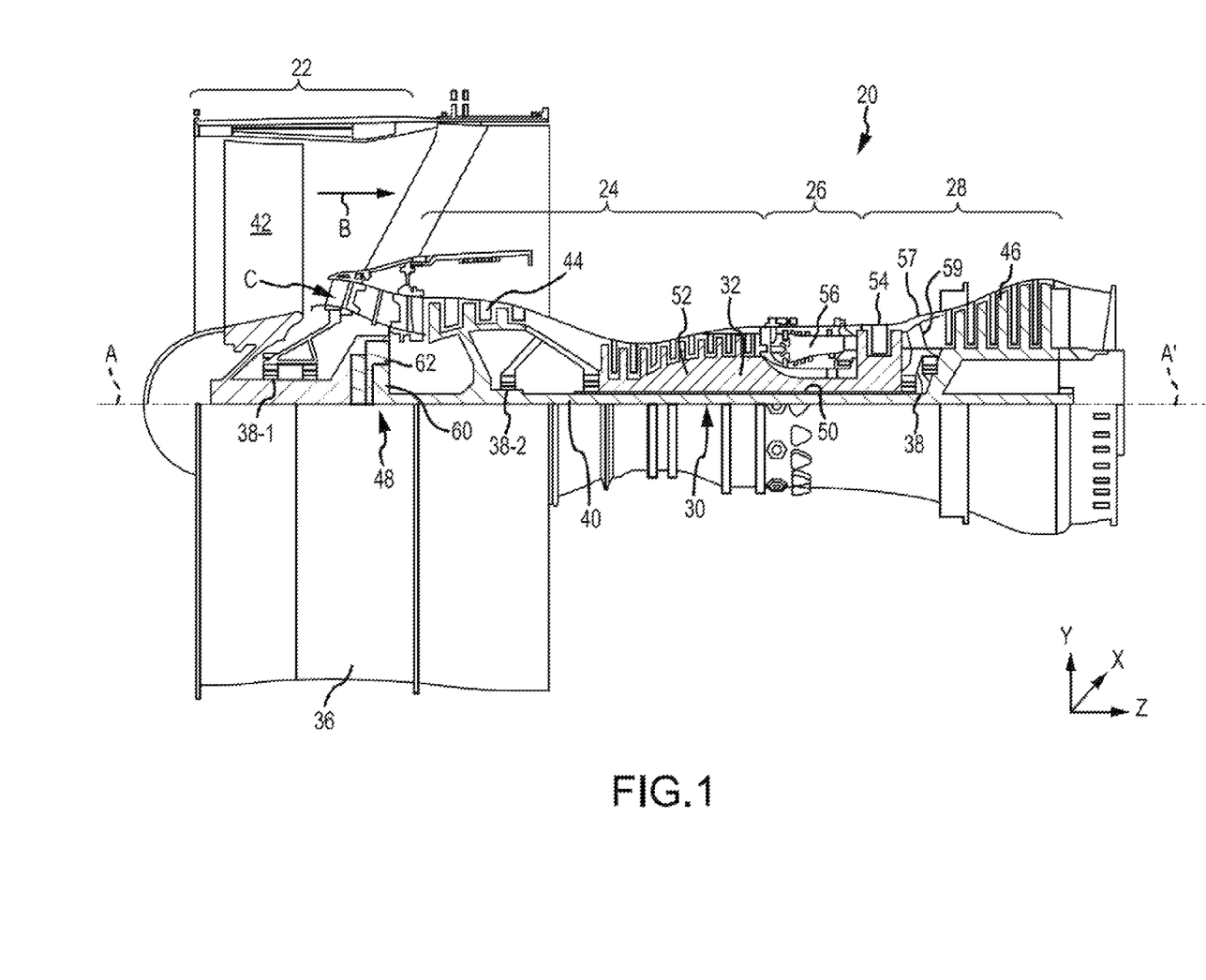
FIG. 1 illustrates a schematic view of a gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines. Further, three-spool architectures may also be included.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclical gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2A:
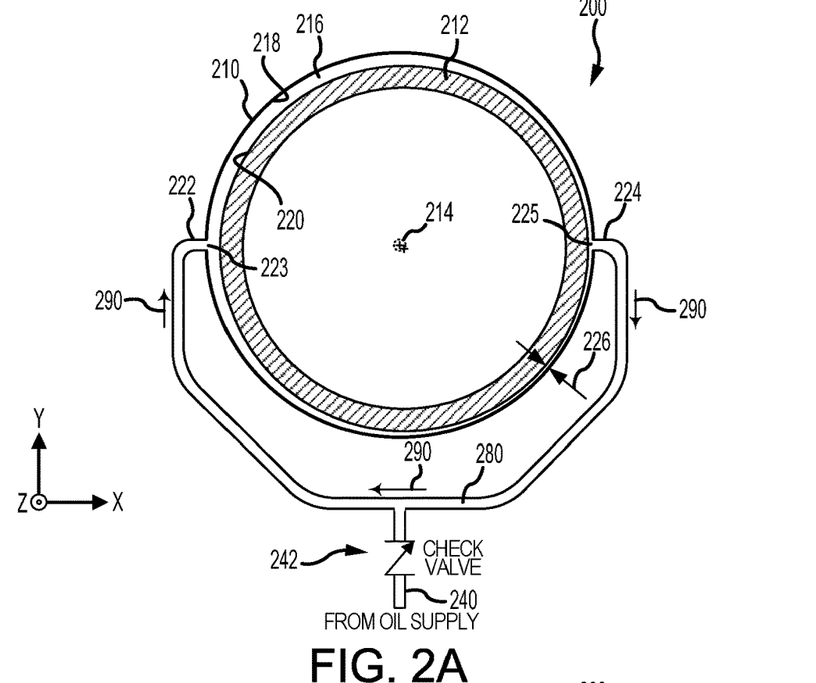
FIG. 2A is an improved damper schematically illustrated in a first orbital position showing inlet supply lines, in accordance with various embodiments.
Figure 2B:
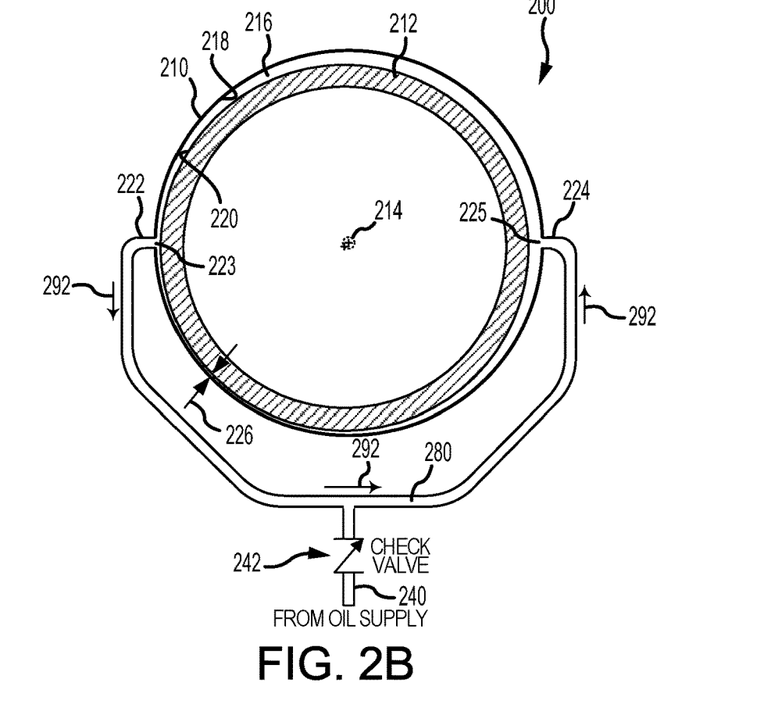
FIG. 2B is an improved damper schematically illustrated in a second orbital position showing inlet supply lines, in accordance with various embodiments.

With reference to FIG. 2A and FIG. 2B, a fluid film damper system 200 is illustrated in accordance with various embodiments. XYZ axes are provided for ease of illustration. In various embodiments, fluid film damper system 200 comprises a support housing 210 disposed about a cylindrical internal member 212 which is subject to attempted cyclical orbital motion 214. Support housing 210 may be an annular support housing. Cylindrical internal member 212 may be a nonrotating bearing sleeve, hereinafter referred to as the sleeve 212. A flow of damping fluid is introduced into the annular volume 216 formed between the inner surface 218 of the support housing 210 and the outer nonrotating surface 220 of the sleeve 212 via a supply conduit (also referred to herein as a first supply conduit) 222 and supply conduit (also referred to herein as a second supply conduit) 224. Supply conduit 222 and supply conduit 224 may receive oil from a common oil supply conduit 240. Common oil supply conduit 240 may comprise a check valve 242 to prevent back flow from annular volume 216 to common oil supply conduit 240.

The fluid may fill the annular volume 216. During operation, the damper thus described absorbs the momentum of the sleeve 212 through viscous and hydro-dynamically created forces resulting from the presence of the damping fluid in the annular volume 216.

The orbital motion 214 of the sleeve 212 causes a circumferential pressure wave to be propagated around the inner surface 218 in advance of the orbiting line of closest approach 226 between the sleeve 212 and the support housing 210. The local fluid pressure reaches a maximum within the circumferential pressure wave which when resolved into component forces produces a spring force, thereby exerting a substantial radial opposing force on the sleeve 212 and preventing undesirable contact between the sleeve 212 and inner surface 218 and a damping force which opposes the orbiting motion. For example, FIG. 2A illustrates sleeve 212 at a first position of its orbit and FIG. 2B illustrates sleeve 212 at a second position of its orbit.

Fluid pressure may be maintained within the annular volume 216 by providing check valve 242. In various embodiments, supply conduit 222 and supply conduit 224 may be sized to regulate the volume flow of damping fluid through the supply conduits 222, 224, as well as to maintain the fluid pressure within the annular volume 216 as high as practicable to prevent separation of dissolved air in the moving low pressure zone. For typical aircraft gas turbine engines having a lubricating oil supply average pressure of 30-200 pounds per square inch (207-1,380 kPa), the dynamic operating pressures of the annular volume 216 may be in the range of 500 to 2.000 pounds per square inch (3.450 to 13,800 kPa).

In various embodiments, supply conduit 222 supplies oil to a first inlet 223 to annular volume 216 and supply conduit 224 supplies oil to a second inlet 225 to annular volume 216. First inlet 223 is disposed opposite the annular volume 216 from second inlet 225. First inlet 223 may be disposed one hundred and eighty degrees (180°) around the annular volume 216 from second inlet 225. As the circumferential pressure wave propagates around the annular volume 216, the pressure acting at supply conduit 222 attempts to oscillate, similar to that of a sin wave. The pressure acting at supply conduit 224 attempts to oscillate, similar to that of a sin wave, equal and opposite to the pressure acting at supply conduit 222. With particular focus on FIG. 2A, as the pressure at supply conduit 224 increases, oil and/or oil pressure may be communicated from annular volume 216, into supply conduit 224, through supply conduit 222 and back into annular volume 216 (see arrows 290). In this regard, annular volume 216, supply conduit 222, and supply conduit 224 may define a full loop flow path 280. Full loop flow path 280 may be generally free of obstructions (e.g., a valve). Similarly, with particular focus on FIG. 2B, as the pressure at supply conduit 222 increases, oil and/or oil pressure may be communicated from annular volume 216, into supply conduit 222, through supply conduit 224 and back into annular volume 216 (see arrows 292). Thus, full loop flow path 280 tends to minimize pressure fluctuations in supply conduit 222 and supply conduit 224. With momentary focus on FIG. 2A, by coupling first inlet 223 to second inlet 225 via first supply conduit 222 and second supply conduit 224, the relatively high pressure at second inlet 225 is effectively canceled by the relatively low pressure at first inlet 223. Similarly, with momentary focus on FIG. 2B, by coupling first inlet 223 to second inlet 225 via first supply conduit 222 and second supply conduit 224, the relatively low pressure at second inlet 225 is effectively canceled by the relatively high pressure at first inlet 223 In this regard, the full loop configuration of supply conduit 222 and supply conduit 224 may tend to minimize the pressure experienced by check valve 242.

In various embodiments, supply conduit 222 and supply conduit 224 may be sized such that the flow path length through supply conduit 222, between check valve 242 and annular volume 216, is equal to the flow path length through supply conduit 224, between check valve 242 and annular volume 216. In this regard, check valve 242 may be coupled half way between first inlet 223 and second inlet 225. Stated differently, common oil supply conduit 240 may be split into two equal length supply paths (i.e., supply conduit 222 and supply conduit 224) in fluid communication with annular volume 216. In this manner, the pressure fluctuations (e.g., spikes in pressure) experienced by check valve 242 may tend to be minimized.

In various embodiments, common oil supply conduit 240 is connected in series with supply conduit 222 and supply conduit 224. In various embodiments, supply conduit 222 and supply conduit 224 are coupled in parallel between common oil supply conduit 240 and annular volume 216.

Figure 3:
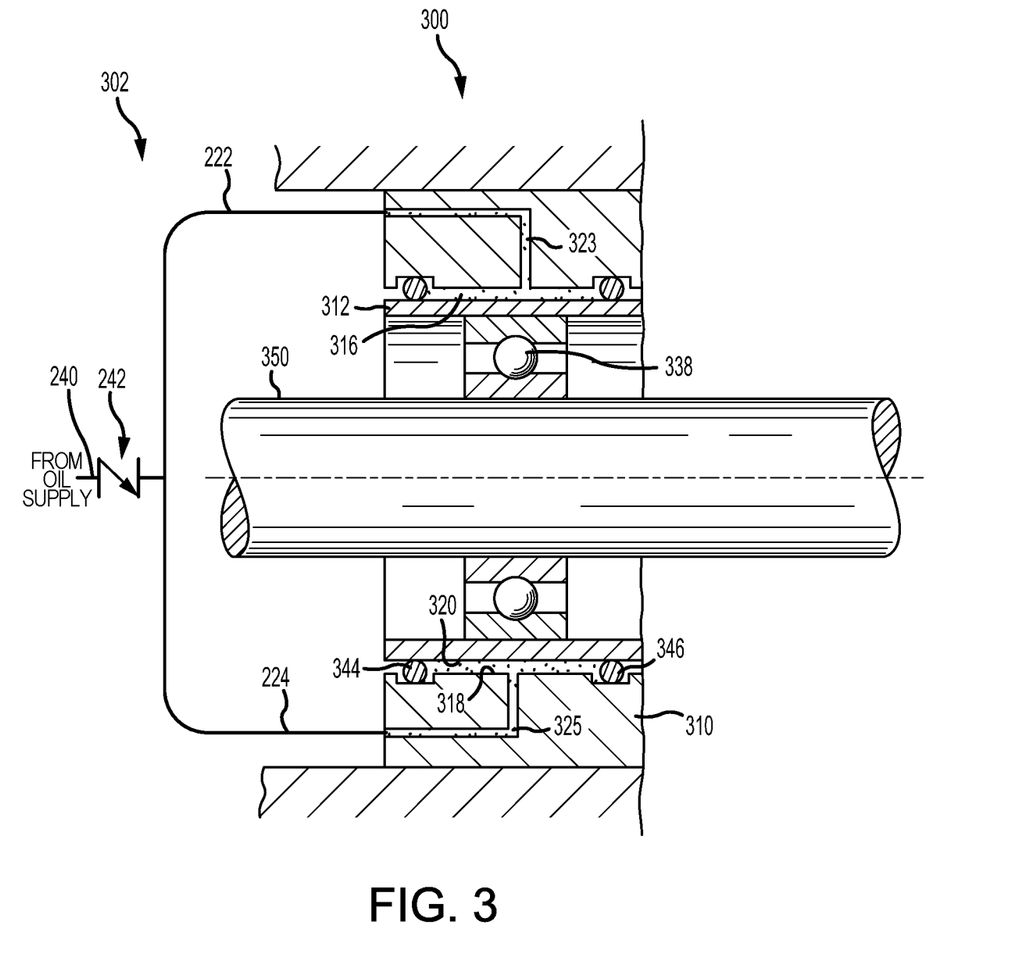
FIG. 3 illustrates a longitudinal cross sectional view of a damper with a schematic view of an oil supply system coupled to the damper, in accordance with various embodiments.

With reference to FIG. 3, a sectional view of an example fluid damper 300 taken in the plane of the central shaft axis is illustrated, in accordance with various embodiments. Fluid damper 300 may be supplied with oil from fluid supply 302, comprising supply conduit 222, supply conduit 224, common oil supply conduit 240 and check valve 242. The annular volume 316 is shown between the cylinder surface 320 and the inner surface 318 of the support housing 310. Longitudinal flow of damping fluid from the annular volume 316 is prevented by longitudinal seals 344, 346. Longitudinal seals 344, 346 may be any suitable seal including elastomeric O-rings, among others. Cylindrical member 312 may be a nonrotating bearing sleeve mounted over a bearing 338. Rotating shaft 350 may be supported by bearing 338. The orbital motion 214 (see FIG. 2A and FIG. 2B) may be excited by a vibration of shaft 350.

Supply conduit 222 may be coupled to support housing 310. First inlet 323 may comprise a channel or orifice disposed through support housing 310. Supply conduit 224 may be coupled to support housing 310. Second inlet 325 may comprise a channel or orifice disposed through support housing 310. However, in various embodiments, supply conduit 222 and supply conduit 224 may be integral to support housing 310, for example as described with respect to FIG. 5 herein.

Figure 4:
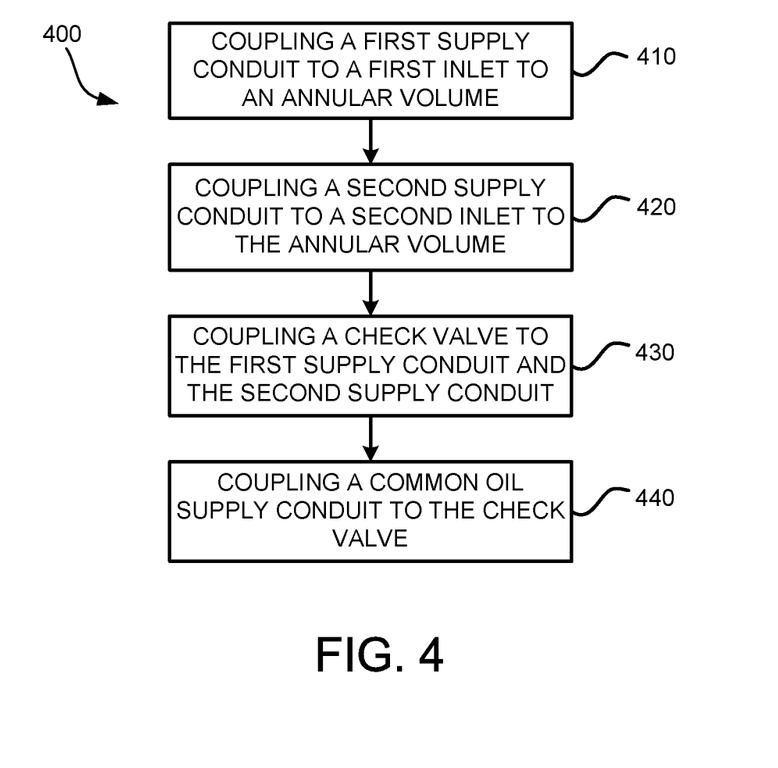
FIG. 4 is a method for installing a fluid film damper, in accordance with various embodiments.

With reference to FIG. 4, a method 400 for installing a fluid film damper is provided, in accordance with various embodiments. Method 400 includes coupling a first supply conduit to a first inlet to an annular volume (step 410). Method 400 includes coupling a second supply conduit to a second inlet to the annular volume (step 420). Method 400 includes coupling a check valve to the first supply conduit and the second supply conduit (step 430). Method 400 includes coupling a common oil supply conduit to the check valve (step 440).

With combined reference to FIG. 3 and FIG. 4. Step 410 may include coupling first supply conduit 222 to first inlet 323 to annular volume 316. Step 420 may include coupling second supply conduit 224 to second inlet 325 to annular volume 316. Step 430 may include coupling check valve 242 to be in fluid communication with first supply conduit 222 and second supply conduit 224, whereby a fluid is supplied to first supply conduit 222 and second supply conduit 224. Step 440 may include coupling common oil supply conduit 240 to check valve 242, whereby the fluid is supplied to first supply conduit 222 and second supply conduit 224 via check valve 242.

Figure 5:
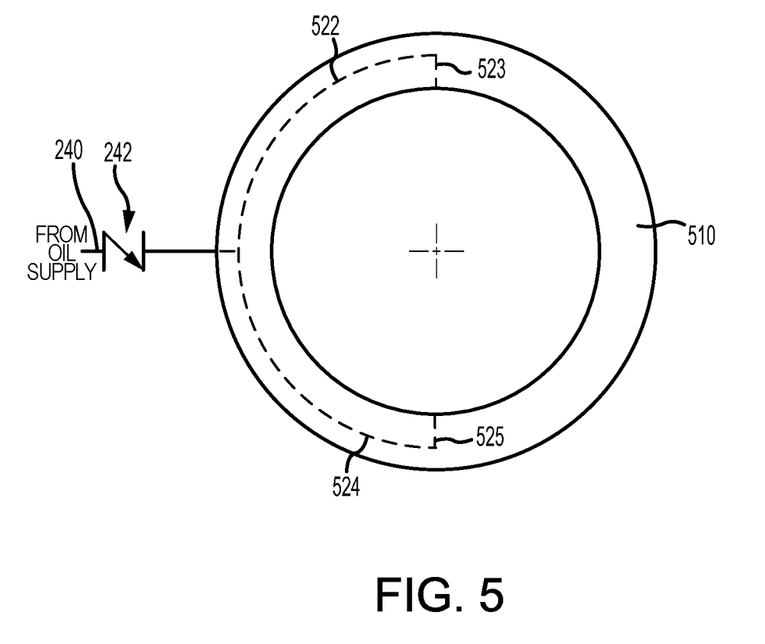
FIG. 5 illustrates a schematic view of a damper fluid supply arrangement with a first supply conduit and a second supply conduit formed into a support housing, in accordance with various embodiments.

With reference to FIG. 5, a schematic view of a support housing 510 taken in the plane orthogonal of the central shaft axis is illustrated, in accordance with various embodiments. In various embodiments, a supply conduit 522, a supply conduit 524, a first inlet 523, and a second inlet 525 may be formed into support housing 510. In various embodiments, supply conduit 522, supply conduit 524, first inlet 523, and second inlet 525 may be similar to supply conduit 222, supply conduit 224, first inlet 323, and second inlet 325, respectively, as described in FIG. 3. By forming supply conduit 522 and supply conduit 524 as channels disposed in support housing 510, check valve 242 may be coupled to support housing 510 via a single common oil supply conduit 240 routed from the check valve 242 to the support housing 510, as opposed to two separate supply conduits (e.g., supply conduit 222 and supply conduit 224) being routed therebetween. In this regard, supply conduit 522, supply conduit 524, first inlet 523, and second inlet 525 may comprise channels formed into support housing 510. Supply conduit 522, supply conduit 524, first inlet 523, and/or second inlet 525 may be formed into support housing 510 via any suitable manufacturing technique, such as drilling, milling, or casting, among others.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A fluid film damper, comprising:
   a sleeve;

an annular support housing surrounding the sleeve;
an annular volume between the annular support housing and the sleeve;
a first supply conduit in fluid communication with a first inlet to the annular volume;
a second supply conduit in fluid communication with a second inlet to the annular volume, wherein the first inlet is disposed opposite the annular volume from the second inlet; and
a common oil supply conduit in fluid communication with the annular volume via a check valve, wherein the common oil supply conduit supplies the fluid to the annular volume via the first supply conduit and the second supply conduit,
wherein a first length of a first flow path between the check valve and the first inlet is equal to a second length of a second flow path between the check valve and the second inlet.

2. The fluid film damper of claim 1, wherein the first inlet is disposed 180° around the annular volume from the second inlet.

3. The fluid film damper of claim 1, wherein the sleeve is mounted about a shaft being supported by a bearing.

4. The fluid film damper of claim 3, wherein the shaft rotates about a central shaft axis with respect to the sleeve.

5. The fluid film damper of claim 4, wherein the fluid film damper dampens the transverse orbital movement of a vibration excited from the shaft whereby a high pressure and low pressure wave pattern precesses orbitally within said annular volume to drive the fluid between the first inlet and the second inlet via the first supply conduit and the second supply conduit.

6. The fluid film damper of claim 1, wherein the check valve prevents back flow for the fluid from the first supply conduit and from the second supply conduit.

7. The fluid film damper of claim 1, wherein the check valve is coupled halfway between the first inlet and the second inlet.

8. A fluid film damper, comprising:
a sleeve;
an annular support housing surrounding the sleeve;
an annular volume between the annular support housing and the sleeve;
a first supply conduit in fluid communication with a first inlet to the annular volume;
a second supply conduit in fluid communication with a second inlet to the annular volume, wherein the first inlet is disposed opposite the annular volume from the second inlet, and the first supply conduit and the second supply conduit form a full loop flow path between the first inlet and the second inlet;
a common oil supply conduit in fluid communication with the annular volume via the first supply conduit and the second supply conduit; and
a check valve, wherein the common oil supply conduit supplies the fluid to the first supply conduit and the second supply conduit via the check valve,
wherein a first length of a first flow path between the check valve and the first inlet is equal to a second length of a second flow path between the check valve and the second inlet.

9. The fluid film damper of claim 8, wherein the first inlet is disposed 180° around the annular volume from the second inlet.

10. The fluid film damper of claim 8, wherein the sleeve is mounted about a shaft being supported by a bearing.

11. The fluid film damper of claim 10, wherein the shaft rotates about a central shaft axis with respect to the sleeve.

12. The fluid film damper of claim 11, wherein fluid film damper controls the transverse orbital movement of a vibration excited from the shaft whereby a high pressure and low pressure wave pattern precesses orbitally within said annular volume to drive the fluid between the first inlet and the second inlet via the first supply conduit and the second supply conduit.

13. The fluid film damper of claim 8, wherein the check valve prevents back flow for the fluid from the first supply conduit and from the second supply conduit.

14. The fluid film damper of claim 8, wherein the check valve is coupled halfway between the first inlet and the second inlet.

15. A method for installing a fluid film damper, comprising:
coupling a first supply conduit to a first inlet to an annular volume;
coupling a second supply conduit to a second inlet to the annular volume, wherein the first inlet is disposed opposite the annular volume from the second inlet;
coupling a check valve to the first supply conduit and the second supply conduit, wherein a first length of a first flow path between the check valve and the first inlet is equal to a second length of a second flow path between the check valve and the second inlet; and
coupling a common oil supply conduit to the check valve, wherein the common oil supply conduit is in fluid communication with the annular volume via the check valve, wherein the common oil supply conduit supplies the fluid to the annular volume via the first supply conduit and the second supply conduit.

16. The method of claim 15, wherein the first supply conduit is coupled to the second supply conduit to form a full loop flow path between the first inlet and the second inlet.

17. The method of claim 15, further comprising disposing an annular support housing to surround a sleeve.

18. The method of claim 17, wherein the annular volume is at least partially defined by the annular support housing and the sleeve.

19. The method of claim 15, wherein the first inlet is disposed 180° around the annular volume from the second inlet.

* * * * *